United States Patent [19]

Jardin et al.

[11] 4,191,068
[45] Mar. 4, 1980

[54] DRIVE ARRANGEMENT FOR SLIDING ROOFS, WINDOW PANES AND OTHER SIMILAR MEMBERS IN MOTOR VEHICLES

[75] Inventors: Hans Jardin, Inning; August Hirschberger, Munich; Karl-Heinz Isleif, Percha, all of Fed. Rep. of Germany

[73] Assignee: Webasto-Werk W. Baier GmbH and Co., Fed. Rep. of Germany

[21] Appl. No.: 918,270

[22] Filed: Jun. 22, 1978

[30] Foreign Application Priority Data

Jun. 25, 1977 [DE] Fed. Rep. of Germany ... 7720015[U]

[51] Int. Cl.² .............................................. F16H 55/02
[52] U.S. Cl. ...................................... 74/625; 151/29; 251/130
[58] Field of Search ............. 74/625, 665 C; 251/130; 151/29, 5

[56] References Cited
U.S. PATENT DOCUMENTS 3,534,630  10/1970  Schwerdhofer ........................ 74/625

3,548,704  12/1970  Kutryk .............................. 151/29 X

Primary Examiner—Andrew V. Kundrat
Attorney, Agent, or Firm—Craig and Antonelli

[57] ABSTRACT

A drive arrangement for sliding roofs, window panes, and other similar sliding members of motor vehicles is constructed for motorized operation and also for emergency manual operation. According to a preferred embodiment, the driving shaft of the drive arrangement has a first part of a clutch constrained from movement therewith and a second part displaceably mounted relative to the first part for interconnecting the drive motor with a drive pinion and for disengaging the drive pinion from the drive motor in a second relative position of the clutch parts. The driving force transmittable between the above-noted clutch parts is controlled by an adjustment member mounted on the driving shaft. The adjustment member can be connected to a manually operable handle for emergency operation of the sliding member by a handle through the use of a locking member which secures the adjustment member relative to the driving shaft in a plurality of positions.

12 Claims, 6 Drawing Figures

DRIVE ARRANGEMENT FOR SLIDING ROOFS, WINDOW PANES AND OTHER SIMILAR MEMBERS IN MOTOR VEHICLES

BACKGROUND AND SUMMARY OF THE INVENTION

The invention relates to an electric drive means for sliding roofs, window panes and the like for motor vehicles, with a drive motor connected by a friction clutch with a driving pinion, mounted nonrotatably on a driven shaft, for the adjustment mechanism of the part to be moved, whereby the friction clutch comprises a driving part mounted loosely on the driven shaft and a driven part connected nonrotatably with the driving shaft, which are pressed against one another on the one hand by a bead on the driven shaft and on the other hand by spring means abutting the driving part, the compression force being adjustable by displacing the driven shaft by means of a polygonal nut screwed on one projecting end of the driven shaft.

In order to permit emergency operation of the part to be moved if the electric drive means fails, it is known to design the projecting end of the driven shaft in such manner that it can be rotated by a special tool. Such an arrangement is disclosed in German Auslegeschrift 1,068,128, and German Offenlegungsschrift 1,505,611.

The goal of the invention is to provide an electric driving means of the type described hereinabove wherein emergency operation of the part to be moved is possible without a special tool.

This goal is achieved according to the invention by virtue of the fact that the polygonal nut is lockable in a plurality of positions in a nonrotatable manner with the driven shaft and with a handle for emergency operation of the part to be moved.

According to a preferred embodiment, a cap is mounted on top of the polygonal nut to protect the latter, said cap being provided with inner teeth which cooperate with the polygonal surfaces of the nut, the number of teeth in said cap being a multiple of the number of edges on the nut, said cap further being connected nonrotatably to the driven shaft and connectable by means of a handle for emergency operation of the part to be moved. In order to allow the polygonal nut to be locked in any position, the projecting end of the driven shaft and the cap can be provided with cooperating surfaces which permit relative rotation of these two parts by half the angular distance between adjacent teeth on the internal toothing.

Preferably the cap is made of a tough elastic plastic, and is provided with internal projections which mesh with the threads of the driven shaft thereby preventing the cap from being loosened inadvertently.

If very fine adjustment of the polygonal nut is not required, said nut can be designed as a crown nut and the driving shaft can be provided with a through cross bore to accept a locking pin for the crown nut. The crown nut itself, like the cap described hereinabove, can be rotated for emergency operation of the part to be moved by means of a simple socket wrench or open-end wrench, such as is normally present in a vehicle for use in removing time wheel nuts when changing a tire.

These and further objects, features and advantages of the present invention will become more obvious from the following description when taken in connection with the accompanying drawings which show, for purposes of illustration only, several embodiments in accordance with the present invention.

DETAILED DESCRIPTION OF THE PREFERRED EMBODIMENTS

Figure 1:
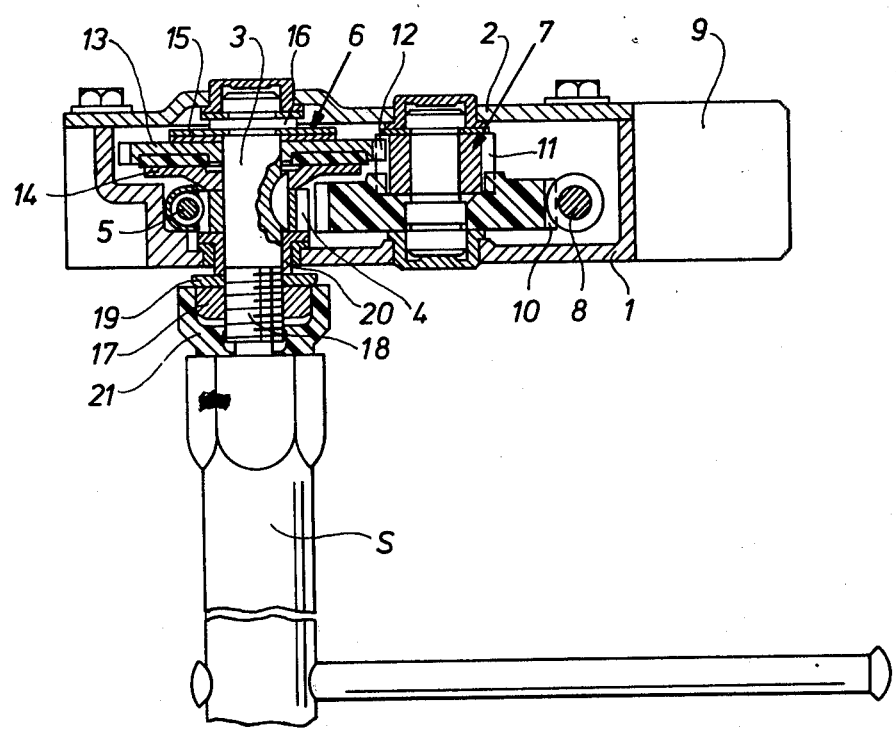
FIG. 1 is a cross-section through a drive or electric motor for operation of a sliding roof of a motor vehicle in accordance with a first embodiment of the invention.

We refer first of all to FIGS. 1 to 4, wherein a first embodiment of the invention is shown. Reference numeral 1 refers to a drive housing which is sealed by a cover 2 and a acceptd a driven shaft 3, with which a driving pinion 4 is nonrotatably connected such as by the key and slot arrangement shown in FIG. 1, said pinion engaging an incompressible threaded cable 5, said cable being connected with the part to be moved, for example, the cover of a motor vehicle roof. Driven shaft 3 meshes with a gear 7 through a friction clutch 6, said gear being driven by an electric motor 9 through a worm 8. Gear 7 is designed as a double gear wheel, provided with a first toothing 10 which engages worm wheel 8 and a second toothing 11 which engages toothing 12 of a plate 13, said plate forming the driving part of friction clutch 6.

The driven part 14 of the friction clutch is nonrotatably connected to driven shaft 3 in the same manner as pinion 4. A friction coating is disposed between the driving clutch part 13 and the driven clutch part 14. The clutch parts 13 and 14 are pressed against one another by two leaf springs 15, which abut a bead 16 on driven shaft 3 on the one hand and driving clutch part 13 on the other. Driving pinion 4 and driven clutch part 14 are disposed axially displaceably on driven shaft 3. A nut 17 serves to adjust the compression force, said nut being threaded onto a section 18 of driven shaft 3 which projects out of housing 1 and is provided with external thread 18a and is supported against driven pinion 4 by an insert disk 19 and a bushing 20.

By rotating nut 17, driven shaft 3 is displaced relative to driving clutch part 13, thus changing the tension on the leaf spring 15. Nut 17 is a conventional hexagonal nut. A cap 21 serves to lock hexagonal nut 17, said cap, as shown particularly in FIG. 4, being provided with inner toothing 22, the number of the teeth being multiple of the number of edges on nut 17, in this embodiment, four times the number of edges on the nut.

The end segment 23 of driven shaft 3 is provided with two flattened areas 24 opposite one another, and the bottom 25 of cap 21 is provided with an opening 26 so designed that the cap 21 can be fastened nonrotatably to the end segment 23 of driven shaft 3. Opening 26 has two surfaces which are opposite one another and surfaces 24 of end segment 23, said surfaces each consisting of two flat sections 27 and 28 at an angle to one another. These flat sections allow the cap 21 to be rotated relative to driven shaft 3 by, for example, 7.5°, so that cap 21 can be slipped onto hexagonal nut 17 regardless of the position of the latter.

Figure 3:
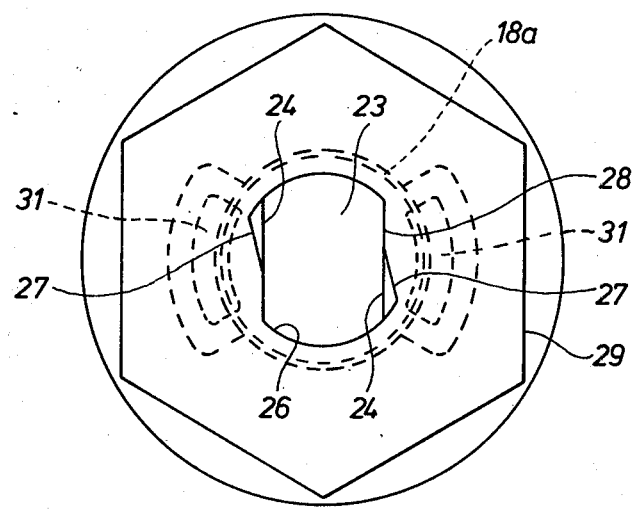
FIG. 3 is a view in the direction of arrow I in FIG. 2.
Figure 4:
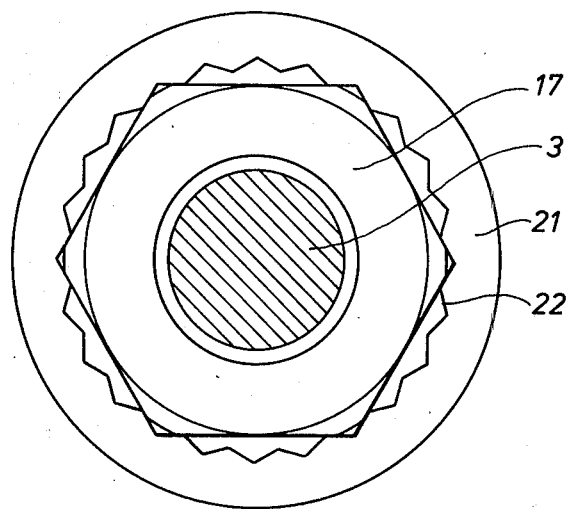
FIG. 4 is a cross-section along line II—II in FIG. 2.

As is also shown in FIG. 3, the outside contour 29 of cap 21 is made in the form of a hexagonal nut, and it can therefore be turned by a normal socket wrench (S in FIG. 1), if the electric drive fails and the part to be moved must be driven by hand. Under such circumstances, the wrench S is able to rotate the shaft 3 and driving pinion 4 for displacing the cable 5 independent of the electric motor 9 since the force applied by the wrench will overcome the frictional engagement between clutch parts 13 and 14.

Figure 2:
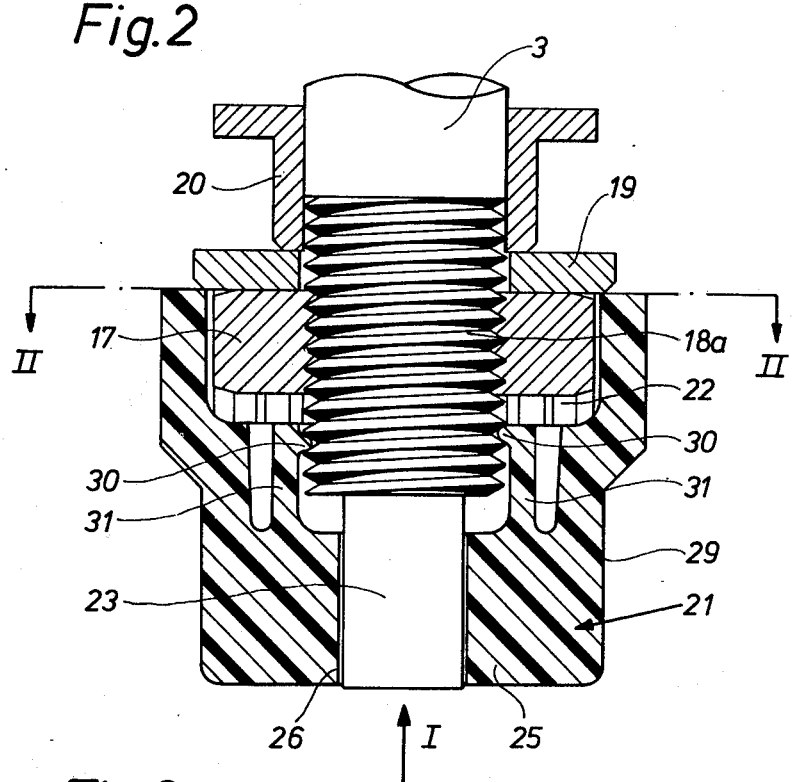
FIG. 2 shows a detail of FIG. 1 on an enlarged scale.

In order to prevent inadvertent loosening of cap 21, the latter is provided with inwardly directed projections 30, which as is shown in FIG. 2 and FIG. 3, engage the threads of external thread 18a on driven shaft 3. These projections 30 are provided on tabs 31 which are connected at only one end with cap 21 and are thereby elastic in the radial direction, so that they flex when the cap is installed and can lock into the threads under the influence of their own tension.

Figure 5:
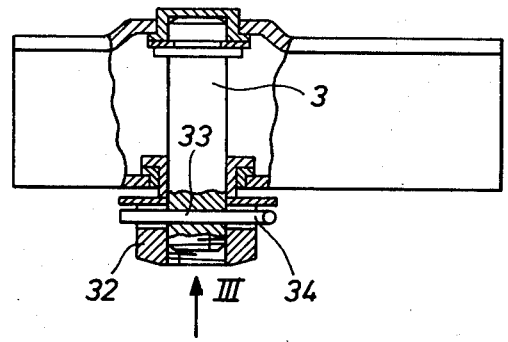
FIG. 5 is a partial cross-section similar to FIG. 1 of a second embodiment of the invention.
Figure 6:
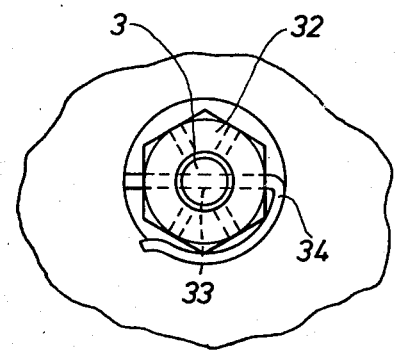
FIG. 6 is a top view in the direction of arrow III in FIG. 5.

In the embodiment according to FIGS. 5 and 6, exact adjustment of the spring tension of the friction clutch is sacrificed in favor of an especially simple design, with a hexagonal crown nut 32 being provided in the first embodiment instead of hexagonal nut 17 and cap 21, said crown nut 32 being mounted on driven shaft 3 by a pin or cotter pin 34 passed through a cross bore 33 on driven shaft 3. Crown nut 32 can be locked in a plurality of different positions (six in the embodiment) with the driven shaft 3, whereby the tension of the leaf springs in the friction clutch can be adjusted. The outside contour of crown nut 32 corresponds to that of a normal hexagonal nut, and it can therefore be rotated by means of an ordinary socket wrench in the event that driven shaft 3 must be rotated when the electric drive fails.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A drive arrangement for sliding roofs, window panes and other similar sliding members in motor vehicles comprising:
   a motor drive;
   a driving shaft;
   a driving pinion for displacing the sliding member, said pinion being arranged on said driving shaft, and being constrained to rotate with said driving shaft;
   a clutch having a first part constrained for movement with the driving shaft and a second part displaceably mounted relative to said first part for interconnecting said motor drive with said drive pinion in a first relative position of said first and second parts and for disengaging said drive pinion from said motor drive in a second relative position of the first and second parts;
   adjustment means mounted on said driving shaft for adjusting the driving force transmittable between said first and second parts, said adjustment means being connectable to a manually operable handle; and
   locking means for securing said adjustment means relative to said driving shaft in a plurality of positions for enabling emergency operation of the sliding member by said handle.

2. A drive arrangement according to claim 1, wherein said adjustment means is a polygonal nut threaded upon said driving shaft for adjusting the axial displacement of said shaft.

3. A drive arrangement according to claim 1 or 2, wherein said locking means is a cap, said cap being mountable on said adjustment means in a plurality of positions, and wherein said cap is an intermediary connecting said said handle to said adjustment means.

4. A drive arrangement according to claim 3, wherein said adjustment means has a plurality of edges and wherein said cap is provided with a number of inner teeth for drivingly cooperating with said edges, said number of teeth being a multiple of said plurality of edges.

5. A drive arrangement according to claim 4, wherein said driving shaft is provided with a projecting end, and wherein said cap is provided with cooperating surfaces, said cooperating surfaces allowing relative rotation between said cap and driving shaft limited to half the angular distance between adjacent inner teeth of said cap.

6. A drive arrangement according to claim 5, wherein said cap is made of tough elastic plastic and is provided with internal projections which are engageably with said driving shaft.

7. A drive arrangement according to claim 3, wherein said cap is made of tough elastic plastic and is provided with internal projections which are engageably with said driving shaft.

8. A drive arrangement according to claim 1, wherein said adjustment means comprises a crown nut, wherein a throughbore is provided in said driving shaft, and wherein said locking means is a pin engageable in said crown nut and driving shaft for locking said crown nut to said driving shaft in a plurality of positions.

9. A drive arrangement according to claim 2, wherein said polygonal nut is a crown nut, wherein said driving shaft is provided with a throughbore, and wherein said locking means comprises a pin engageable in said crown nut and driving shaft for locking said crown nut to said driving shaft in a plurality of positions.

10. A drive arrangement according to claim 1, or 2, or 8, wherein said manually operable handle is a tire wrench.

11. A drive arrangement according to claim 2 or 8, wherein said clutch is a friction clutch and said first and second parts are displaced relative to one another by axial displacement of said driving shaft.

12. A drive arrangement according to claim 3, wherein said clutch is a friction clutch and said first and second parts are displaced relative to one another by axial displacement of said driving shaft.

* * * * *